(12) United States Patent
Thelin et al.

(10) Patent No.: US 7,082,494 B1
(45) Date of Patent: Jul. 25, 2006

(54) DISK DRIVE EXECUTING A PREEMPTIVE MULTITASKING OPERATING SYSTEM COMPRISING TASKS OF VARYING PRIORITY

(75) Inventors: Gregory B. Thelin, Garden Grove, CA (US); Michael S. Rothberg, Foothill Ranch, CA (US); Eric L. Severtson, Trabuco Canyon, CA (US); John Edward Lauber, Pleasanton, CA (US); Horia Cristian Simionescu, Foster City, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 464 days.

(21) Appl. No.: 10/329,167

(22) Filed: Dec. 24, 2002

(51) Int. Cl.
*G06F 13/00* (2006.01)

(52) U.S. Cl. ..................... 711/112; 369/47.1
(58) Field of Classification Search ................ 711/112
See application file for complete search history.

(56) References Cited

U.S. PATENT DOCUMENTS

| | | | |
|---|---|---|---|
| 5,220,653 A | | 6/1993 | Miro |
| 5,729,718 A | | 3/1998 | Au |
| 5,991,825 A | | 11/1999 | Ng |
| 6,084,733 A | * | 7/2000 | Ohzeki et al. ............. 360/53 |
| 6,084,799 A | * | 7/2000 | Tanzawa et al. ....... 365/185.23 |
| 6,141,728 A | | 10/2000 | Simionescu et al. |
| 6,145,052 A | | 11/2000 | Howe et al. |
| 6,185,058 B1 | * | 2/2001 | Dobbek et al. ............. 360/48 |
| 6,272,565 B1 | | 8/2001 | Lamberts |
| 6,279,108 B1 | * | 8/2001 | Squires et al. ............ 712/244 |
| 6,343,351 B1 | | 1/2002 | Lackman et al. |
| 6,360,243 B1 | * | 3/2002 | Lindsley et al. ............ 718/103 |
| 6,418,510 B1 | | 7/2002 | Lamberts |
| 6,442,648 B1 | | 8/2002 | Genduso et al. |
| 6,515,819 B1 | | 2/2003 | Schmidt et al. |
| 6,618,780 B1 | * | 9/2003 | Popat ..................... 710/264 |
| 6,789,132 B1 | * | 9/2004 | Hoskins .................... 710/5 |
| 6,826,630 B1 | | 11/2004 | Olds et al. |
| 2002/0124135 A1 | | 9/2002 | Newman |
| 2002/0199038 A1 | * | 12/2002 | Mamiya et al. ............. 710/6 |
| 2003/0056034 A1 | | 3/2003 | Olds et al. |
| 2003/0056059 A1 | | 3/2003 | Fox et al. |
| 2003/0188092 A1 | | 10/2003 | Heath et al. |
| 2003/0204687 A1 | | 10/2003 | Hyde et al. |
| 2004/0019745 A1 | * | 1/2004 | Espeseth et al. .......... 711/137 |
| 2005/0055517 A1 | | 3/2005 | Olds et al. |

OTHER PUBLICATIONS

Eitan Bachmat and Jiri Schindler, Analysis of methods for scheduling low priority disk drive tasks, Jun. 2002, ACM Press, ACM SIGMETRICS Performance Evaluation Review, vol. 30, Issue 1.*

* cited by examiner

*Primary Examiner*—Kevin Verbrugge
*Assistant Examiner*—Daniel Ko
(74) *Attorney, Agent, or Firm*—Jason T. Evans, Esq.; Howard H. Sheerin, Esq.

(57) ABSTRACT

A disk drive is disclosed for executing a preemptive multi-tasking operating system comprising tasks of varying priority, including a disk task for processing disk commands by initiating seek operations and configuring parameters of a read/write channel, a host task for initiating disk commands in response to host commands received from a host computer, a background task for initiating disk commands to perform background operations including a defect scan of the disk, and an execution task for arbitrating the disk commands generated by the host task and the background task and for transmitting the arbitrated disk commands to the disk task.

38 Claims, 10 Drawing Sheets

SEGMENT DESCRIPTOR

| NAME | DESCRIPTION |
|---|---|
| LBA | STARTING LBA |
| COUNT | NUMBER OF DATA SECTORS |
| BUFFER OFFSET | INDICATES LOCATION OF STARTING LBA WITHIN THE CACHE BUFFER |
| CLUSTER RESOURCE BIT MAP | 8 BIT FIELD SPECIFIES WHICH TYPE OF CACHE SEGMENT RESOURCES ARE ALLOCATED TO THIS SD (BIT 0 1-SECTOR, BIT 1 2-SECTOR, ETC) |
| NEXT SD INDEX | INDEX VALUE FOR THE NEXT SD |
| PREV SD INDEX | INDEX VALUE FOR THE PREVIOUS SD |
| STATE | DIRTY VALID, FREE, AVAIL/VALID, AND WRITE VERIFY REPRESENTED AS AN ENUM |
| CYLINDER | USED BY RPO FOR STARTING CYLINDER |
| HEAD | USED BY RPO FOR STARTING HEAD |
| SEEK LATENCY | NUMBER OF WEDGES REQUIRED TO SEEK TO THIS CH FROM THE CURRENT REFERENCE WEDGE |
| ROTATIONAL LATENCY | NUMBER OF WEDGES REQUIRED TO REACH FIRST TARGET DATA SECTOR AFTER SEEK |
| REWRITE/VERIFY COUNT | COUNT OF HOW MANY TIMES A PARTICULAR SECTOR HAS BEEN RE-WRITTEN OR VERIFIED |
| RESTART LBA OFFSET | LBA WHERE WRITE VERIFY FAILED TO FACILITATE RESTARTING THE REWRITE AND REVERIFY OPERATION |

FIG. 3

COMMAND DESCRIPTOR

| NAME | DESCRIPTION |
|---|---|
| CDD POINTER | COMMAND DEVIATION DESCRIPTOR ADDRESS |
| PRE-READ COUNT | NUMBER OF PRE-READ SECTORS DESIRED FOR READING |
| POST-READ COUNT | NUMBER OF POST-READ SECTORS DESIRED FOR READING |
| IAD INDEX | INTELLIGENT ABORT DESCRIPTOR INDEX |

FIG. 4

COMMAND DEVIATION DESCRIPTOR

| NAME | DESCRIPTION |
|---|---|
| FINE TRACK OFFSET | TRACKING OFFSET FOR READ/WRITE JOG |
| ERROR RECOVERY FLAGS | DISABLE BASIC ERROR RECOVERY COMPONENTS:<br>xxxxxxx1 = OFF-TRACK DISABLE<br>xxxxxx1x = SIMPLE JOGGING RETRY DISABLE<br>xxxxx1xx = PREAMP CORNER SHIFT RETRY DISABLE<br>xxxx1xxx = TA DETECTION DISABLE<br>xxx1xxxx = FIRMWARE ECC DISABLE<br>xx1xxxxx = MRI RECOVERY DISABLE<br>x1xxxxxx = SKIRTING DISABLE |
| | DISABLE ADVANCED ERROR RECOVERY COMPONENTS:<br>xxxxxxx1 = FIR CALIBRATION DISABLE<br>xxxxxx1x = NORMAL ECC/DAM TABLE DISABLE<br>xxxxx1xx = TA STATIC RECOVERY DISABLE<br>xxxx1xxx = TA DYNAMIC RECOVERY DISABLE<br>xxx1xxxx = TA SEEK AWAY DISABLE<br>xx1xxxxx = TA BURNISH DISABLE<br>x1xxxxxx = POLARITY BIT FLIP RECOVERY DISABLE<br>1xxxxxxx = DISABLE HIGH-FLY-WRITE RECOVERY |
| | xxxxxYYY: ON THE FLY CORRECTION CONTROL<br>    000 = STANDARD MODE<br>    001 = NO OTF CORRECTION<br>    010 = LOW BYTES PER INTERLEAVE<br>    011 = MEDIUM BYTES PER INTERLEAVE<br>    100 = MAX BYTES PER INTERLEAVE<br>xxxx1xxx = IGNORE RELOCATIONS ON READ/WRITE<br>xxx1xxxx = DON'T INSERT TARE ON UNCORRECTABLE<br>xx1xxxxx = DISABLE SYNC MARK FOR WEDGE READ/WRITE<br>x1xxxxxx = ENABLE TONE SCAN ON WEDGE READ<br>1xxxxxxx = BUFFER TRANSFER FOR WEDGE COMMAND |
| | xxxxxxx1 = FORCE FAILURE ON SECTOR TEST |
| SEEK RETRY LIMIT | MAX. NUMBER OF NON-FATAL RETRIES |
| SEEK TIME-OUT | MAX. SEEK TIME BEFORE ERROR |
| FILE VERIFY LIMIT | FAIL AFTER COUNT NUMBER OF FAILED VERIFIES |
| WEDGE OFFSET | COUNTS FROM SERVO GATE TO SECTOR START |
| WEDGE LENGTH | NUMBER OF BYTES IN WEDGE |
| RELOCATE AFTER RETRY | FORCE SECTOR RELOCATION AFTER RETRY LEVEL REACHED |
| PATTERN CODE SELECTOR | 0 = D.C.<br>1 = 1T, 2 = 2T, ..., 16 = 16T |

FIG. 5

TRANSPORT DESCRIPTOR

| NAME | DESCRIPTION |
|---|---|
| REQ CODE | OPCODE OF ROUTINE TO EXECUTE FROM |
| FLAGS | QUEUED TO DISK |
| PARAMETER | USER ROUTINE PARAMETER IF NEEDED |
| CALL BACK ADDRESS | ADDRESS OF ROUTINE EXECUTED UPON CLIENT REQUEST COMPLETION |
| NEXT TD | INDEX TO NEXT TD |
| SD INDEX | SEGMENTS DESCRIPTOR INDEX |
| CD INDEX | COMMAND DESCRIPTOR INDEX |
| TASK ID | INITIATORS TASK ID |

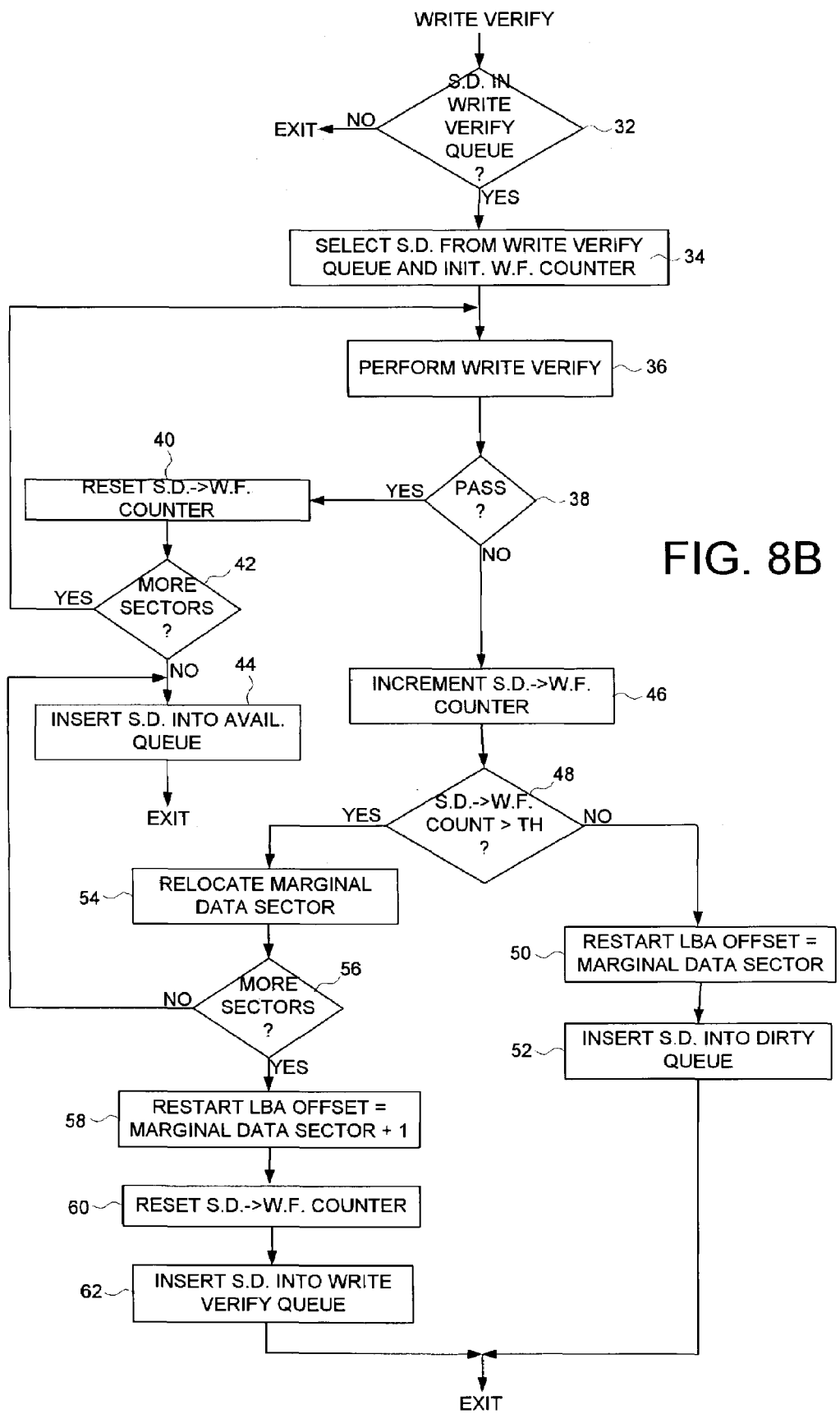

DISK ACTIVITY BLOCK

| NAME | DESCRIPTION |
|---|---|
| PARENT DAB | POINTER TO A PARENT DAB |
| CDD POINTER | POINTER TO CDD DATA STRUCTURE |
| NEXT TRACK LBA | THE FIRST LBA OF THE NEXT TRACK |
| COUNT | TOTAL NUMBER OF DATA BLOCKS IN THIS REQUEST |
| REMAINING COUNT | THE REMAINING NUMBER OF DATA BLOCKS IN THIS REQUEST TO BE PROCESSED |
| SERVO RETRY COUNTER | THE NUMBER OF TIMES THE SERVO HAS FAILED FOR THE CURRENT DATA SECTOR |
| READ RETRY COUNTER | THE NUMBER OF TIMES THE READ RETRY HAS FAILED FOR THE CURRENT DATA SECTOR |
| WRITE RETRY COUNTER | THE NUMBER OF TIMES THE WRITE RETRY HAS FAILED FOR THE CURRENT DATA SECTOR |
| SD POINTER | POINTER TO SD DATA STRUCTURE FOR THIS REQUEST |
| CD POINTER | POINTER TO CD DATA STRUCTURE FOR THIS REQUEST |
| ZONE | THE ZONE OF THE NEXT LBA |
| CHW | THE CYLINDER/HEAD/WEDGE OF THE NEXT LBA |

FIG. 10

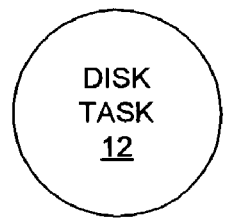
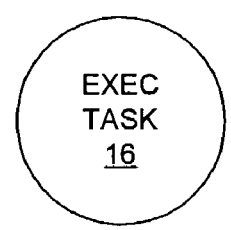
TASK LEVEL
HIGHEST PRIORITY TOP
LOWEST PRIORITY BOTTOM
FIG. 11
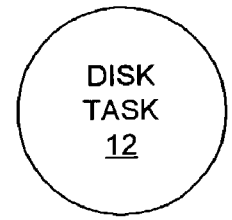
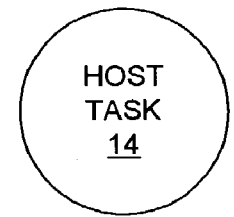
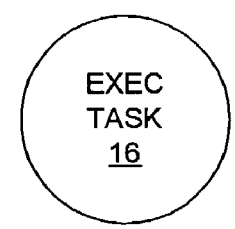
TASK LEVEL
HIGHEST PRIORITY TOP
LOWEST PRIORITY BOTTOM
FIG. 12

DISK DRIVE EXECUTING A PREEMPTIVE MULTITASKING OPERATING SYSTEM COMPRISING TASKS OF VARYING PRIORITY

CROSS REFERENCE TO RELATED APPLICATIONS AND PATENTS

This application is related to co-pending U.S. patent application Ser. No. 10/080,780 entitled "DISK DRIVE USING ROTATIONAL POSITION OPTIMIZATION ALGORITHM TO FACILITATE WRITE VERIFY OPERATIONS" filed on Feb. 22, 2002, co-pending U.S. patent application Ser. No. 10/286,127 entitled "DISK DRIVE EMPLOYING A MULTI-PHASE ROTATIONAL POSITION OPTIMIZATION (RPO) ALGORITHM" filed on Oct. 31, 2002, co-pending U.S. patent application Ser. No. 10/262,014 entitled "DISK DRIVE EMPLOYING THRESHOLDS FOR CACHE MEMORY ALLOCATION" filed on Sep. 30, 2002, co-pending U.S. patent application Ser. No. 10/262,492 entitled "DISK DRIVE MAINTAINING A CACHE LINK ATTRIBUTE FOR EACH OF A PLURALITY OF ALLOCATION STATES" filed on Sep. 30, 2002, co-pending U.S. patent application Ser. No. 10/286,682 entitled "DISK DRIVE PRE-COMPUTING SEEK PARAMETERS FOR A CONTINUATION TRACK AND A NEXT COMMAND TO FACILITATE CONTINUING A READ-AHEAD OR ABORTING THE READ-AHEAD" filed on Oct. 31, 2002, co-pending U.S. patent application Ser. No. 10/329,166 entitled "DISK DRIVE EXECUTING PART OF A LINKED DISK COMMAND" filed on Dec. 24, 2002, and co-pending U.S. patent application Ser. No. 10/329,161 entitled "DISK DRIVE EXECUTING A MANUFACTURING PROGRAM INTERNALLY BY EXECUTING DISK COMMANDS THROUGH A VECTOR" filed on Dec. 24, 2002, the disclosures of which are incorporated herein by reference.

BACKGROUND OF THE INVENTION

1. Field of the Invention

The present invention relates to disk drives for computer systems. More particularly, the present invention relates to a disk drive executing a preemptive multitasking operating system comprising tasks of varying priority.

2. Description of the Prior Art

Prior art disk drives have been implemented by distributing the operating tasks among multiple hardware components to alleviate the bandwidth of a single microprocessor. For example, the disk drive may comprise a disk controller for interfacing with the host, performing cache operations and background operations, etc., and a servo controller for performing the real-time servo control operations of the voice coil motor and spindle motor. However, a distributed architecture increases the cost of the disk drive due to the number of hardware components needed to perform each designated task.

In addition, prior art disk drives may execute a cooperative multitasking operating system comprising only two tasks: a disk task for performing disk related operations and background operations (e.g., diagnostic procedures), and a host task for interfacing with a host computer. Because the background operations are implemented by the disk task they cannot be easily interrupted when a new host command is received.

SUMMARY OF THE INVENTION

The present invention may be regarded as a disk drive comprising a disk, a head actuated radially over the disk, a read/write channel for interfacing with the disk through the head, and a microprocessor for executing a preemptive multitasking operating system. The preemptive multitasking operating system comprises a plurality of tasks, each task comprising a different priority level. The plurality of tasks comprise a disk task, a host task, a background task, and an execution task. The disk task for processing disk commands by initiating seek operations and configuring parameters of the read/write channel. The host task for initiating disk commands in response to host commands received from a host computer. The background task for initiating disk commands to perform background operations including a defect scan of the disk. The execution task for arbitrating the disk commands generated by the host task and the background task and for transmitting the arbitrated disk commands to the disk task.

In one embodiment, the priority level of the disk task is higher than the priority level of the host task, in another embodiment, the priority level of the host task is higher than the priority level of the execution task, and in yet another embodiment, the priority level of the execution task is higher than the priority level of the background task.

In one embodiment, the execution task executes a rotational position optimization (RPO) algorithm for selecting a next disk command to execute relative to a location of the head with respect to the disk.

In another embodiment, the preemptive multitasking operating system comprises a plurality of interrupt requests (IRQs) including a host bus interface interrupt generated by host interface circuitry communicating with the host computer, wherein the host task receives a host command in response to the host bus interface interrupt.

In still another embodiment, the preemptive multitasking operating system comprises a plurality of interrupt requests (IRQs) including a disk formatter interrupt for configuring disk format parameters associated with a format of the disk, wherein the disk task is notified when the data formatter interrupt finishes processing a current command.

In another embodiment, the preemptive multitasking operating system comprises a plurality of interrupt requests (IRQs) including a wedge event interrupt. The disk task is notified when the wedge event interrupt determines a seek operation has completed. The execution task is notified when the wedge event interrupt determines the head has reached a servo wedge associated with the RPO algorithm.

In one embodiment, the disk comprises a plurality of servo wedges and the preemptive multitasking operating system further comprises a servo wedge interrupt for performing servo operations at each servo wedge. In one embodiment, the preemptive multitasking operating system further comprises a fast interrupt request (FIQ), wherein the FIQ has a priority level higher than the IRQs. The FIQ implements the servo wedge interrupt, and the FIQ interfaces with the disk task through the servo wedge interrupt.

In another embodiment, the disk task performs error recovery when an error is detected while accessing the disk. In one embodiment, the disk task performs retry error recovery, and in another embodiment, the disk task performs firmware error correction code (ECC) processing.

In yet another embodiment, the disk task relocates data blocks from marginal data sectors to spare data sectors. In one embodiment, the disk task accesses relocated data blocks stored in spare data sectors during disk access operations.

In still another embodiment, the plurality of tasks comprises an error recovery task for performing firmware error correction code (ECC) processing when an error is detected while accessing the disk. In one embodiment, the disk task performs retry error recovery concurrent with the error recovery task performing firmware error correction code (ECC) processing when an error is detected while accessing the disk. In yet another embodiment, the plurality of tasks comprises a rotational position optimization (RPO) task for selecting a next disk command to execute relative to a location of the head with respect to the disk.

The present invention may also be regarded as a method for executing a preemptive multitasking operating system in a disk drive. The disk drive comprises a disk, a head actuated radially over the disk, a read/write channel for interfacing with the disk through the head, and a host interface for interfacing with a host computer. A disk task is executed for processing disk commands by initiating seek operations and configuring parameters of the read/write channel. A host task is executed for initiating disk commands in response to host commands received from a host computer. A background task is executed for initiating disk commands to perform background operations including a defect scan of the disk. An execution task is executed for arbitrating the disk commands generated by the host task and the background task and for transmitting the arbitrated disk commands to the disk task. Each of the tasks has a different priority level.

BRIEF DESCRIPTION OF THE DRAWINGS

FIG. 3 shows a segment descriptor data structure used to execute disk commands initiated by the host task and the background task according to an embodiment of the present invention.

FIG. 4 shows a command descriptor data structure comprising a plurality of fields used to execute a disk command, including a pointer to a command deviation descriptor.

FIG. 5 shows a command deviation descriptor data structure comprising a plurality of fields for custom configuring parameters of the disk drive for select disk commands.

FIG. 8B is a flow diagram illustrating a write verify process, including to increment a write verify counter in the segment descriptor each time a write verify fails and to relocate a data sector if the number of write verify failures exceeds a threshold.

FIG. 10 shows a disk activity block (DAB) data structure used to communicate between the various modules of the disk task shown in FIG. 9.

FIG. 11 shows an embodiment of the present invention comprising a separate error recovery task.

FIG. 12 shows an embodiment of the present invention comprising a separate RPO task.

DESCRIPTION OF THE PREFERRED EMBODIMENTS

Figure 1:
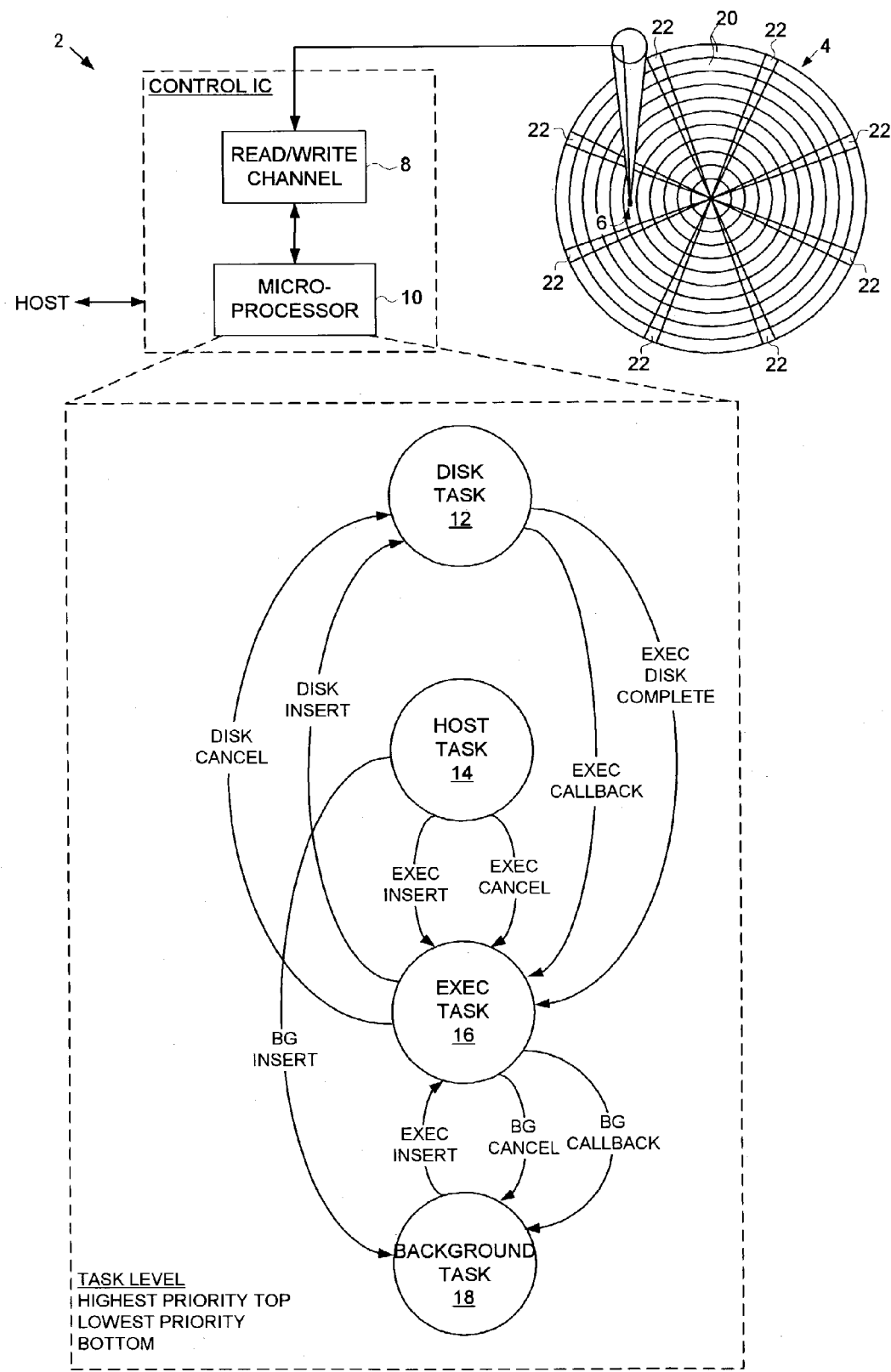
FIG. 1 shows a disk drive according to an embodiment of the present invention comprising a microprocessor for executing a preemptive multitasking operating system comprising a disk task, a host task, an execution task, and a background task.

FIG. 1 shows a disk drive 2 executing a preemptive multitasking operating system according to an embodiment of the present invention. The disk drive 2 comprises a disk 4, a head 6 actuated radially over the disk 4, a read/write channel 8 for interfacing with the disk 4 through the head 6, and a microprocessor 10 for executing the preemptive multitasking operating system. The preemptive multitasking operating system comprises a plurality of tasks, each task comprising a different priority level. The plurality of tasks comprise a disk task 12, a host task 14, a background task 16, and an execution (exec) task 18. The disk task 12 for processing disk commands by initiating seek operations and configuring parameters of the read/write channel 8. The host task 14 for initiating disk commands in response to host commands received from a host computer. The background task 18 for initiating disk commands to perform background operations including a defect scan of the disk 4. The execution task 16 for arbitrating the disk commands generated by the host task 14 and the background task 18 and for transmitting the arbitrated disk commands to the disk task 12.

Any suitable microprocessor 10 may be employed in the embodiments of the present invention, including the ARM 966E-S microprocessor manufactured by licensees of ARM Incorporated.

In the embodiment of FIG. 1 the disk 4 comprises a plurality of tracks 20, where each track 20 comprises a plurality of data sectors and a plurality of embedded servo sectors 22 recorded at a periodic interval around the circumference of the track 20. The embedded servo sectors 22 are aligned radially to form a plurality of servo wedges. Each embedded servo sector 22 comprises coarse head positioning information (e.g., a track number) processed by the microprocessor 10 to position the head 6 over a target track, and fine head positioning information (e.g., servo bursts) processed by the microprocessor 10 to maintain the head 6 over a centerline of the target track during read and write operations. The disk 4 shown in FIG. 1 comprises radially spaced, concentric tracks 20, however, any suitable track format may be employed including a spiral track format.

The priority level of the tasks shown in FIG. 1 is from highest priority on the top (disk task 12) to lowest priority on the bottom (background task 18). Since the host task 14 has a higher priority level than the background task 18, the background task 18 does not interfere with the host interface operation. Further, the execution task 16 gives priority to the disk commands received from the host task 14 over disk commands received from the background task 18. This allows the background task 18 to be interrupted (suspended) when a host command is received from the host computer.

After processing the disk command generated by the host task 14, the background task 18 continues the operation it was performing.

In one embodiment, the execution task 16 executes a rotational position optimization (RPO) algorithm for selecting a next disk command to execute relative to a location of the head 6 with respect to the disk 4. Any suitable RPO algorithm may be employed. In general, an RPO algorithm evaluates the mechanical latency of the disk drive (seek and rotational latencies) in order to select disk commands in an order which minimizes the latency. In one embodiment, the RPO algorithm is implemented in multiple phases relative to non-real-time parameters and real-time parameters. Further details of the embodiment employing a multiple phase RPO algorithm are disclosed in the above reference U.S. patent application entitled "DISK DRIVE EMPLOYING A MULTI-PHASE ROTATIONAL POSITION OPTIMIZATION (RPO) ALGORITHM".

Figure 2:
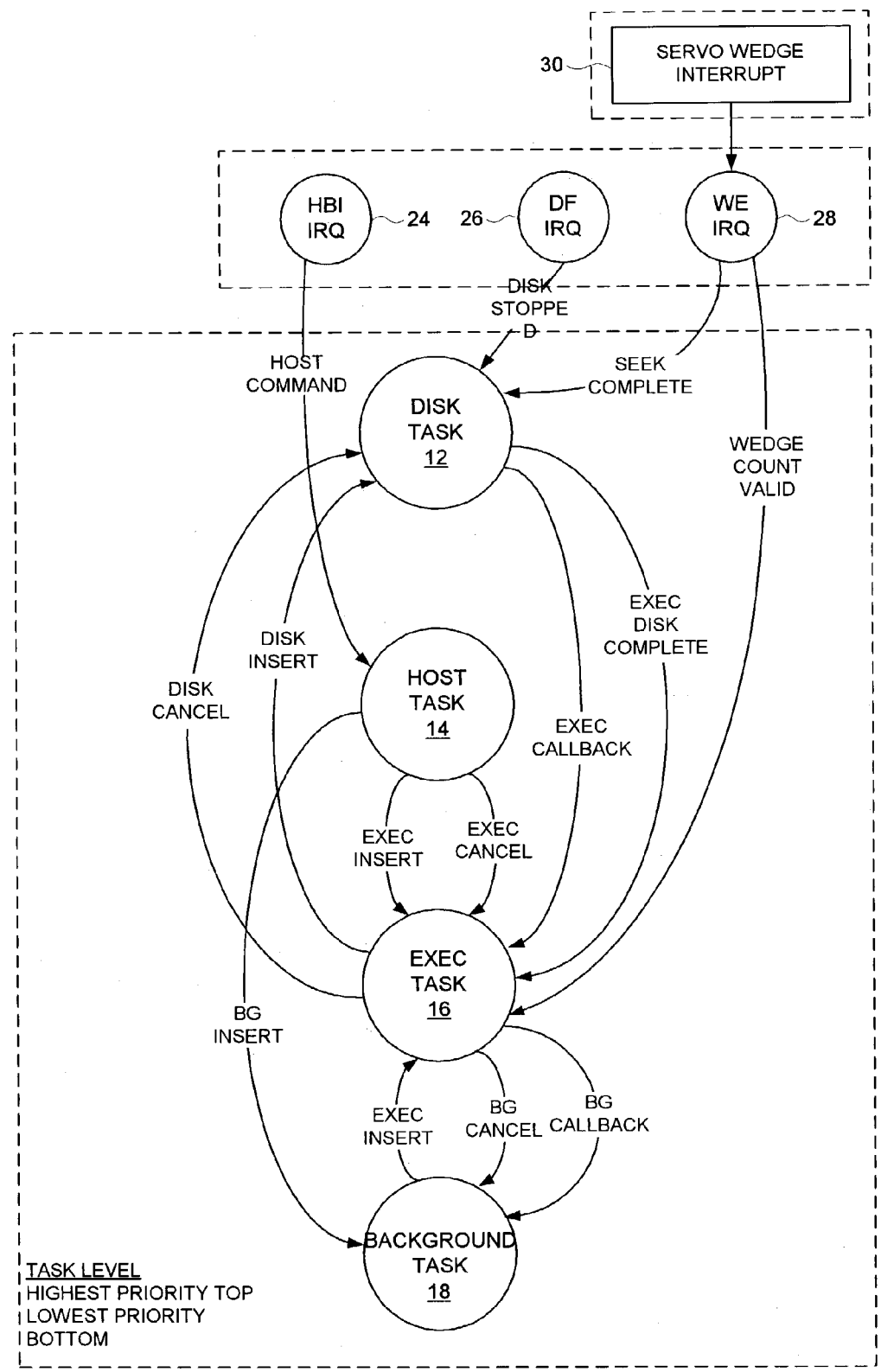
FIG. 2 shows an embodiment of the present invention wherein the preemptive multitasking operating system comprises a plurality of interrupt requests (IRQs) for performing high priority operations.

FIG. 2 shows an embodiment of the present invention wherein the preemptive multitasking operating system further comprises a plurality of interrupt requests (IRQs). A host bus interface (HBI) interrupt 24 is generated by host interface circuitry communicating with the host computer, wherein the host task 14 receives a host command in response to the host bus interface interrupt 24. A disk formatter (DF) interrupt 26 is generated for configuring disk format parameters associated with a format of the disk, wherein the disk task 12 is notified when the data formatter interrupt 26 finishes processing a current command. A wedge event (WE) interrupt 28 is generated, wherein the disk task 12 is notified when the wedge event interrupt 28 determines a seek operation has completed, and the execution task 16 is notified when the wedge event interrupt 28 determines the head has reached a servo wedge associated with the RPO algorithm. A servo wedge interrupt 30 is generated at each servo wedge 22 (FIG. 1) for performing time-critical servo processing operations. The servo wedge interrupt 30 may be implemented as a general IRQ, or in an alternative embodiment, the servo wedge interrupt 30 may be implemented as an FIQ having a priority level higher than the IRQs. In this embodiment, the servo wedge FIQ interfaces with the disk task 12 through the wedge event interrupt 28.

In general, the tasks disclosed in FIG. 1 and FIG. 2 perform the following operations:

DISK TASK 12 is responsible mainly for disk formatting operations for read/write commands, such as determining the track format including number and location of defects and configuring the read/write channel circuitry with appropriate parameters. The DISK TASK 12 runs in response to disk formatting hardware (DF IRQ 26) and wedge event interrupt (WE IRQ 28) indicating that a requested seek has completed.

HOST TASK 14 is responsible for receiving commands from the host. It runs in response to commands received from the host bus interface (HBI) hardware via the HBI IRQ 24.

EXECUTION (EXEC) TASK 16 is responsible for arbitrating the disk commands generated by the host task 14 and the background task 18 and for transmitting the arbitrated disk commands to the disk task 12. In one embodiment, the EXEC TASK 16 implements the multi-phase rotational position optimization (RPO) algorithm for selecting the next command to be executed by the DISK TASK 12. The RPO algorithm typically runs after the DISK TASK 12 has emptied a pipeline slot.

BACKGROUND TASK 18 is responsible for implementing background operations. It typically initiates read/write commands not initiated by the host, for example, while performing diagnostic, calibration, or manufacturing procedures.

There are also a number of event flags associated with each of the tasks:

HOST COMMAND EVENT set by the HBI interrupt 24 service routine when a new command is received from the host.

DISK STOPPED EVENT set by the DF interrupt 26 service routine in connection with a data formatting operation for a current command.

DISK INSERT EVENT set by the EXEC TASK 16 when a next command is inserted into the "next" pipeline slot for the DISK TASK 12. This signals the DISK TASK 12 to pipeline the next command behind the current command being executed.

EXEC DISK COMPLETE EVENT set by the DISK TASK 12 when it moves the next disk command from the "next" pipeline slot into the "current" pipeline slot. This signals the EXEC TASK 16 to execute the RPO algorithm to select the next disk command to execute.

EXEC CALLBACK EVENT set by the DISK TASK 12 after completing the command requested by the EXEC TASK 16.

EXEC INSERT EVENT set by the HOST TASK 14 and BACKGROUND TASK 18 to execute the RPO algorithm based on desired criteria, for example, flushing write commands to free-up cache resources.

EXEC CANCEL EVENT set by the HOST TASK 14 to cancel a command sent to the EXEC TASK 16.

BACKGROUND CALLBACK EVENT set by the EXEC TASK 16 after processing the command requested by the BACKGROUND TASK 18.

BACKGROUND CANCEL EVENT set by the EXEC TASK 16 to cancel the command requested by the BACKGROUND TASK 18.

DISK CANCEL EVENT set by the EXEC TASK 16 to cancel the command in the "next" pipeline slot.

SEEK COMPLETE EVENT set by the wedge event interrupt (WE IRQ 28) to signal the DISK TASK 12 that the requested seek operation has been completed.

WEDGE COUNT VALID EVENT set by the wedge event interrupt (WE IRQ 28) to signal the EXEC TASK 16 that the wedge count is valid and that the second phase of the RPO algorithm may commence.

BACKGROUND INSERT EVENT set by the HOST TASK 14 to start background processing such as diagnostic, calibration, or manufacturing procedures.

In one embodiment, the background task 18 executes manufacturing procedures during manufacture of the disk drive, such as a defect scan of the disk 4 in order to identify and relocate marginal data sectors to spare data sectors. Further details of this embodiment are disclosed in the above referenced U.S. patent application entitled "A DISK DRIVE EXECUTING A MANUFACTURING PROGRAM INTERNALLY BY EXECUTING DISK COMMANDS THROUGH A VECTOR".

FIG. 3 shows a segment descriptor (SD) data structure used to execute disk commands initiated by the host task 14 and the background task 18 according to an embodiment of the present invention. In one embodiment, multiple segment descriptors are linked together to form a linked disk command. The LBA field specifies the starting logical block address (LBA) for the SD, and the COUNT field indicates the number of data sectors associated with the SD. The BUFFER OFFSET field indicates the location of starting LBA in the cache buffer. In one embodiment, thresholds are employed to allocate cache segments from a plurality of segment pools in the cache buffer. More details of this embodiment are disclosed in the above referenced U.S. patent application entitled "DISK DRIVE EMPLOYING THRESHOLDS FOR CACHE MEMORY ALLOCATION". The CLUSTER RESOURCE BIT MAP specifies which cache segment resources are allocated to the SD (bit 0: 1-sector cache segments, bit 1: 2-sector cache segments, bit 2: 4-sector cache segments, etc.). The CLUSTER RESOURCE BIT MAP facilitates cache memory management as described in more detail in the above referenced U.S. patent application entitled "DISK DRIVE MAINTAINING A CACHE LINK ATTRIBUTE FOR EACH OF A PLURALITY OF ALLOCATION STATES".

The NEXT SD INDEX of the SD specifies an index value for a next SD, and the PREV. SD INDEX specifies an index value for a previous SD. These fields facilitate linking SDs together to form linked disk commands in order to improve the RPO algorithm. This embodiment is described in more detail in the above referenced U.S. patent application entitled "DISK DRIVE EXECUTING PART OF A LINKED DISK COMMAND".

The STATE of the SD indicates an allocation state for the cache segments allocated to the SD. The allocation states in this embodiment include:

free—an unallocated cache segment;
available—an allocated cache segment storing write data that has been written to the disk;
valid—an allocated cache segment storing cached read data; and
dirty—an allocated cache segment storing write data not yet written to the disk.

The STATE is used by the execution task 16 to implement various operations, such as allocating/de-allocating cache segments, linking SDs, executing the RPO algorithm, executing a write verify operation, etc.

The CYLINDER and HEAD of the SD specify the starting cylinder and head for accessing the disk 4 to perform the disk command. These fields are used by the RPO algorithm. The SEEK LATENCY of the SD is also used by the RPO algorithm and specifies the number of servo wedges required to seek the head to the cylinder/head (CH) from the current reference wedge. The ROTATIONAL LATENCY field is used by the RPO algorithm and specifies the number of wedges required to reach the first target data sector after the seek. In one embodiment, these fields are updated by the multi-phase RPO algorithm as disclosed in more detail in the above referenced U.S. patent application entitled "DISK DRIVE EMPLOYING A MULTI-PHASE ROTATIONAL POSITION OPTIMIZATION (RPO) ALGORITHM".

The REWRITE/VERIFY COUNT of the SD tracks the number of times a write verify procedure has failed for the SD. If the SD is a write command, after executing the write command the SD is placed in a write verify queue in order to verify the write operation was successful. If the write verify fails, the SD is processed to re-execute the write command. If the number of write verify failures exceeds a threshold, the data block stored in the marginal data sector associated with the SD is relocated to a spare data sector. The RESTART LBA OFFSET of the SD stores the LBA corresponding to the marginal data sector where the write verify failed. This allows the write command and write verify operation to be restarted at the marginal data sector. More details of this embodiment are described below with reference to FIGS. 8A and 8B.

When the execution task 16 selects an SD to execute according to the RPO algorithm, a command descriptor (CD) data structure shown in FIG. 4 is used to append additional information to the SD. The CDD POINTER of the CD points to a command deviation descriptor (CDD) described below with reference to FIG. 5. The PRE-READ COUNT specifies the number of data sectors to read prior to the first target data sector of the current command, and the POST-READ COUNT specifies the number of data sectors to read after the last target data sector of the current command. The IAD INDEX of the CD is used by the RPO algorithm to setup an intelligent abort descriptor (IAD) for the command. The IAD is used to abort the previous command and begin executing the current command. Further details of this embodiment are disclosed in the above referenced U.S. patent application entitled "DISK DRIVE PRE-COMPUTING SEEK PARAMETERS FOR A CONTINUATION TRACK AND A NEXT COMMAND TO FACILITATE CONTINUING A READ-AHEAD OR ABORTING THE READ-AHEAD".

FIG. 5 shows an example of a command deviation descriptor (CDD) according to an embodiment of the present invention which is used to customize configuration parameters for select disk commands. When a CDD is associated with a disk command, the drive operating program initializes the fields of the CDD to default values used during a normal operating mode. A client (e.g., the host, manufacturing or calibration program executed by the background task 18, etc.) may then alter the default parameters to perform a particular operation. By encapsulating the configuration parameters in a CDD data structure and initializing the fields to default values, the disk drive is always properly configured regardless as to how the parameters were configured by the previous disk commands. Further, using well known object oriented techniques, such as inheriting functionality from a base data structure, the CDD can be extended while achieving forward compatibility with existing code and backward compatibility with new code. The CDD shown in FIG. 5 illustrates several suitable configuration parameters, but any suitable configuration parameters may be used in the embodiments of the present invention.

The FINE TRACK OFFSET of the CDD of FIG. 5 specifies a tracking offset for the head during the disk command (the default tracking offset is zero). The ERROR RECOVERY FLAGS of the CDD enable/disable various features of the error recovery system, such as off-track retries, simple jogging retries, preamp corner shift retries, thermal asperity (TA) detection, firmware error correction code (ECC) processing, finite-impulse-response (FIR) calibration, high-fly write, on-the-fly ECC features, relocations, sync mark, etc. Other configuration parameters in the CDD of FIG. 5 include a seek retry limit, seek time-out limit, file verify limit, wedge offset, wedge length, relocate after retry, and sync mark pattern code. A detailed description of the various configuration parameters shown in FIG. 5 is unnecessary to understand the embodiments of the present invention and has been omitted so as not to obscure the disclosure.

In one embodiment, the CDD is configured by the background task 18 executing a background program. For example, the defect scan manufacturing program executed by the background task 18 may issue a disk command as well as a configuration command to modify the configuration parameters of the configuration data structure (the CDD). Both commands are issued through a vector implementing a vendor specific command (VSC) as described in more detail in the above referenced U.S. patent application entitled "DISK DRIVE EXECUTING A MANUFACTURING PROGRAM INTERNALLY BY EXECUTING DISK COMMANDS THROUGH A VECTOR". In another embodiment, a task may modify the configuration parameters of the CDD directly. For example, the disk task 12 may modify the configuration parameters while performing retry error recovery. With each retry operation, the disk task 12 may modify certain configuration parameters, such as certain read/write channel 8 parameters, in an attempt to recover a marginal data sector. Once the marginal data sector is recovered (or relocated), the disk task 12 reverts to the configuration parameters prior to executing the retry error recovery and continues with the current disk command. This embodiment is disclosed in greater detail below with reference to FIG. 10.

In another example embodiment, the disk task 12 implements a track caching algorithm wherein a number of data blocks stored in the spare data sectors of a track are read and cached in order to expedite access to the data blocks for disk commands that would otherwise access the spare data sectors. Since it is unknown whether some of the data blocks in the spare data sectors will be requested, the disk task 12 modifies the configuration parameters of the configuration data structure so that less stringent error recovery is performed while reading the spare data sectors. This improves performance by skipping unrecoverable spare data sectors rather than perform full error recovery, and only loads the track cache with data blocks from the spare data sectors that are recoverable using the less stringent error recovery. If a data block for a spare data sector is requested that is not loaded into the track cache, the disk task 12 will attempt to recover the spare data sector using full error recovery.

Figures 6, 7:
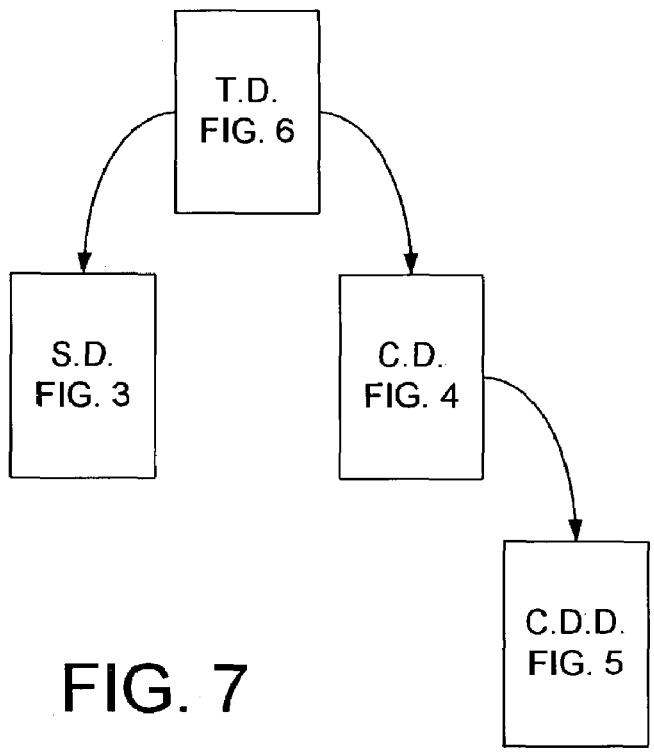
FIG. 6 shows a transport descriptor data structure used to transport commands between the various tasks.
FIG. 7 illustrates the configuration of the various data structures for carrying out disk commands.

In one embodiment, a transport descriptor (TD) data structure shown in FIG. 6 is used to pass commands between the tasks. Each task has a first-in first-out (FIFO) command queue for receiving and processing TDs. If needed, an SD and/or CD is attached to the TD to facilitate disk commands as illustrated in FIG. 7. In one embodiment, when the operating system is initialized a number of TDs are allocated and used as needed. The REQ CODE of the TD allows a client (i.e., a first task) to specify a routine to execute in another task. The QUEUED TO DISK FLAG of the TD is set by the media request manager (MRM) in the execution task 16 when the TD has been queued to the disk task 12. This flag enables the MRM to determine when a requested disk command has completed. The PARAMETER of the TD specifies a user routine parameter if needed. The CALL BACK ADDRESS of the TD specifies an address of the routine to execute when the client's request is completed by the task. The NEXT TD points to the next TD in the queue to execute next (if one exists). The SD INDEX of the TD specifies a SD (if one exists), and the CD INDEX specifies a CD (if one exists). The TASK ID of the TD identifies the client (task) that initiated the TD.

Figure 8A:
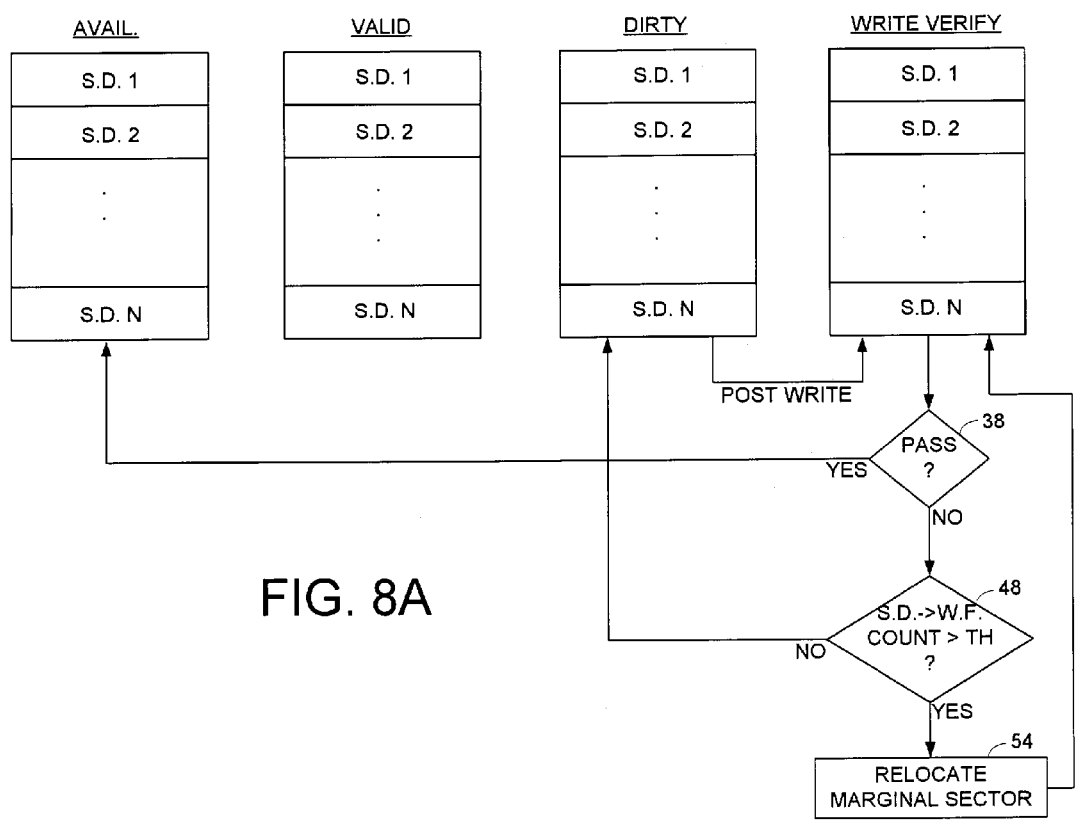
FIG. 8A shows a number of state queues comprising segment descriptors in different allocation states.

FIG. 8A shows an embodiment of the present invention employing a plurality of state queues, wherein each queue stores a number of SDs having a particular allocation state (free, valid, dirty, etc.) as well as a write verify queue. The write verify queue stores SDs implementing write commands waiting to be verified through a write verify operation. The write verify operation reads recently written data sectors to verify recoverability, and may fail relative to a configurable error recovery threshold. In one embodiment, the write verify operation is performed by the background task 18 when the disk drive is idle (not processing host commands). In an alternative embodiment, the SDs stored in the write verify queue are executed along with other pending commands according to the RPO algorithm. Further details of this embodiment are disclosed in the above referenced U.S. patent application entitled "DISK DRIVE USING ROTATIONAL POSITION OPTIMIZATION ALGORITHM TO FACILITATE WRITE VERIFY OPERATIONS".

FIG. 8B is a flow diagram for performing the write verify operation according to an embodiment of the present invention. At step 32 the write verify queue is evaluated to determine whether it contains a pending SD. If so, then at step 34 the SD is selected from the write verify queue and its write verify counter initialized (e.g., set to zero). At step 36 the SD is processed to perform the write verify operation for each of the target data sectors in the SD. If at step 38 one of the target data sectors passes the write verify operation, the write verify counter of the SD is reset at step 40. If at step 42 there are no other target data sectors to verify for the SD, then at step 44 the SD is inserted into the available queue indicating the cache memory may be reused for other disk commands. Otherwise the write verify operation continues at step 36 to verify the remaining target data sectors for the SD.

If the write verify fails at step 38 for at least one of the target data sectors, then at step 46 the write verify counter of the SD is incremented (or in alternative embodiment decremented or otherwise modified). If at step 48 the write verify counter of the SD does not exceed a predetermined threshold, then at step 50 the RESTART LBA OFFSET of the SD is set to the marginal data sector where the write verify failed, and at step 52 the SD is inserted back into the dirty queue so that the write command will be re-executed and re-verified starting with the marginal data sector.

If at step 48 the write verify counter of the SD exceeds the threshold, then at step 54 the marginal data sector where the write verify failed is relocated. In one embodiment, the marginal data sector is relocated inline by immediately writing the data block to the spare data sector, and in an alternative embodiment, the data block is inserted into a write cache and written to the spare data sector while the disk drive is idle. In one embodiment, an SD is used to write the data blocks stored in the write cache to the spare data sectors, wherein the SD is placed in the dirty queue and write verified according to FIG. 8B. If at step 56 there are no other target data sectors to verify for the SD, then at step 44 the SD is inserted into the available queue indicating the cache memory may be reused for other disk commands. Otherwise, at step 58 the RESTART LBA OFFSET of the SD is set to the data sector following the marginal data sector where the write verify failed, and at step 60 the write verify counter of the SD is reset. At step 62 the SD is inserted back into the write verify queue so that the write verify operation for the SD will continue starting with the data sector following the marginal data sector where the write verify operation failed.

Encapsulating the write verify counter into the SD simplifies tracking the number of times a write verify fails for a particular write command. The write verify counter remains with the SD as it is transferred between the write verify queue and the dirty queue, and triggers a relocation of a marginal data sector if the write verify counter exceeds the predetermined threshold.

Figure 9:
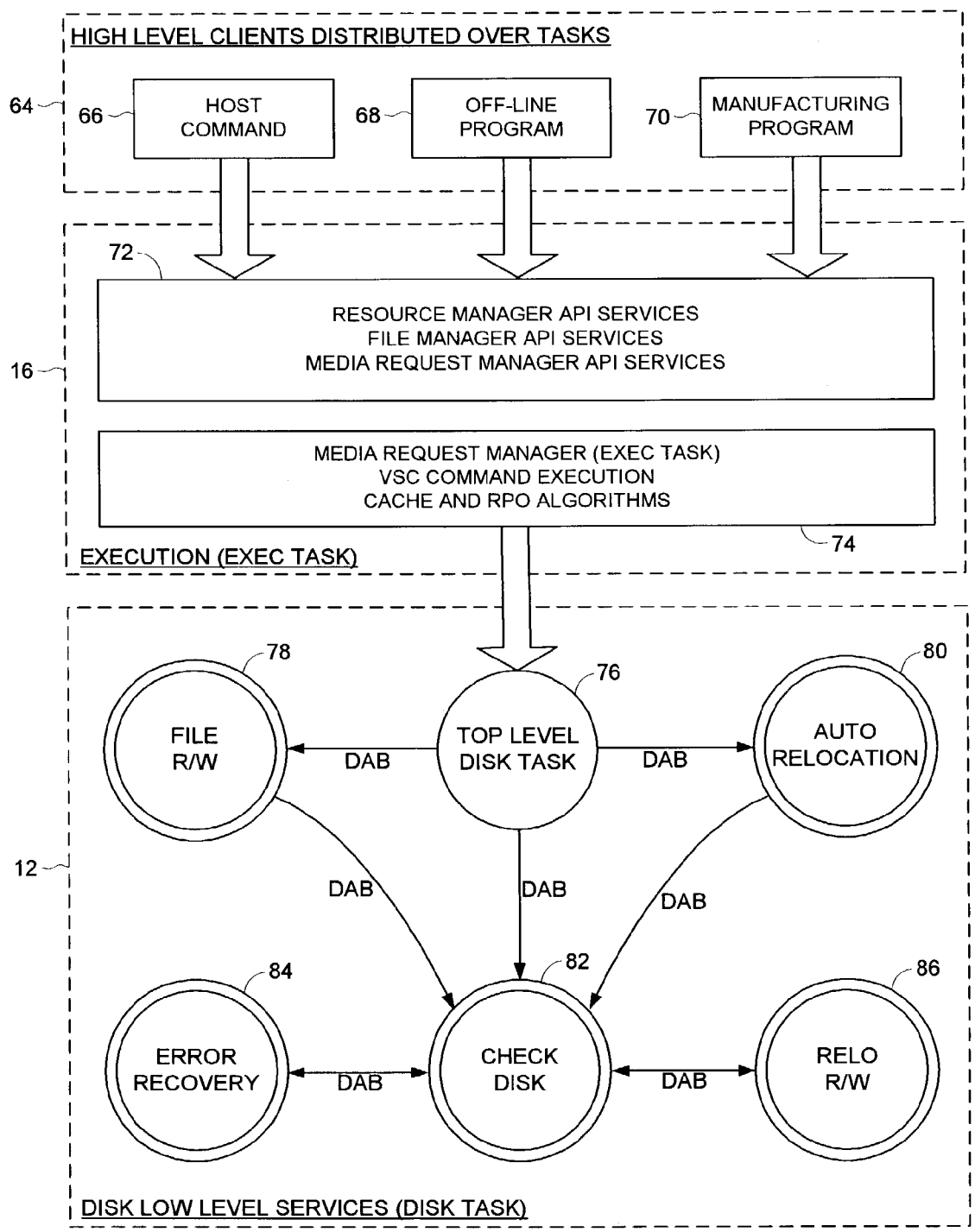
FIG. 9 shows more details of the operations performed by the disk task, including to read/write system files, relocate marginal data sectors, access spare data sectors during read/write operations, and perform error recovery during failed disk access operations.

FIG. 9 shows an overview of the preemptive multitasking operating system, including further details of the execution task 16 and the disk task 12. The high level clients 64 are the originators of disk command requests and include a host computer 66, off-line programs 68 executed by the background task 18 (e.g., a diagnostic or calibration program), and a manufacturing program 70 executed by the background task 18 during a manufacturing process of the disk drive. The execution task 16 comprises application programming interface (API) services for providing a uniform interface regardless as to the task requesting a disk command. For example, vendor specific commands (VSC) may be generated either by an external test system (host computer 66) or the manufacturing program 70. The front-end API services 72 forward the disk commands to a back-end 74 of the execution task 16 implementing a media request manager, a VSC command execution, and the cache and RPO algorithms. Further details of this embodiment are disclosed in the above referenced U.S. patent application entitled "DISK DRIVE EXECUTING A MANUFACTURING PROGRAM INTERNALLY BY EXECUTING DISK COMMANDS THROUGH A VECTOR".

The execution task 16 communicates with the disk task 12 using TDs described above with reference to FIG. 6. The disk task 12 comprises a top level disk task 76 which decodes the TDs, performs limited processing such as performance optimized read and write operations (or cache requests), and distributes other processing to one or more of a plurality of disk task modules including a file read/write module 78, an auto-relocation module 80, a check disk module 82, an error recovery module 84, and a relocation read/write module 86. The file read/write module 78 handles reading and writing system files located in a reserved area of the disk 4 or in semiconductor memory (e.g., FLASH). The auto-relocation module 80 relocates data blocks from marginal data sectors to spare data sectors. In one embodiment, the auto-relocation module 80 relocates a data block for a marginal data sector detected during the write verify operation described above with reference to FIGS. 8A–8B. In an alternative embodiment, a relocation request may be issued by a client (e.g., host computer or manufacturing program executed internally) through a VSC operation. The check disk module 82 contains the physical low level disk access routines, including to centralize the error recovery algorithm. The error recovery module 84 is invoked by the check disk module 82 and implements various error recovery techniques, including retry error recovery and firmware error correction code (ECC) processing (e.g., erasure pointer or Turbo code processing) when an error is detected while accessing the disk. In an alternative embodiment described below with reference to FIG. 11, the firmware ECC processing is implemented by a separate error recovery task 88. The relocation read/write module 86 is invoked by the check disk module 82 when a data block stored in a spare data sector needs to be accessed. As described above, in one embodiment the data blocks read from the spare data sectors of a track are cached in a track cache to expedite subsequent disk commands.

In the embodiment of FIG. 9, the various modules in the disk task 12 communicate with each other using a disk activity block (DAB) data structure, an example for which is shown in FIG. 10. The PARENT DAB field points to a parent DAB which generated the current DAB for the current disk command. This embodiment facilitates performing disk commands using custom configuration parameters through a custom CDD. For example, the disk task 12 may modify the configuration parameters while performing retry error recovery. To facilitate modifying the configuration parameters, a new DAB is generated for the current disk command and the configuration parameters in the CDD of the current DAB (the parent DAB) are copied into the CDD for the new DAB. The configuration parameters in the CDD of the new DAB are then modified with appropriate values (e.g., adjusting the fine tracking offset) and the current disk command re-executed using the custom CDD. Once the marginal data sector is recovered (or relocated), the parent DAB is re-assigned to the current disk command so that the current disk command continues execution using the configuration parameters in the original CDD.

The CDD POINTER of the DAB in FIG. 10 points to the CDD data structure described above with reference to FIG. 5. The NEXT TRACK LBA of the DAB specifies the first LBA of the next track. The COUNT of the DAB specifies the total number of data blocks for the current request. The REMAINING COUNT of the DAB specifies the remaining number data blocks for the current request to be processed. The SERVO RETRY COUNTER of the DAB indicates the number of times the servo has failed for the current data sector. The READ RETRY COUNTER of the DAB indicates the number of times the read retry has failed for the current data sector, and the WRITE RETRY COUNTER indicates the number of times the write retry has failed for the current data sector. The SD POINTER of the DAB points to the SD data structure described above with reference to FIG. 3, and the CD POINTER points to the CD data structure described above with reference to FIG. 4. The ZONE of the DAB identifies the ZONE for the next LBA to process, and the CHW identifies the cylinder/head/wedge for the next LBA to process.

Any suitable number of tasks may be employed in the embodiments of the present invention. In addition, certain operations performed by existing tasks may be implemented in a separate task. FIG. 11 shows an embodiment of the present invention comprising a separate error recovery task 88 for implementing firmware error recovery algorithms. In one embodiment, some or all of the firmware ECC processing performed by the error recovery module 84 of the disk task 12 (FIG. 9) is moved to the error recovery task 88. In another embodiment, the error recovery task 88 performs firmware ECC processing, such as using erasure pointers or performing multiple passes of a Turbo code, concurrent with the disk task 12 performing retry error recovery. In the embodiment shown in FIG. 11, the error recovery task 88 is executed at the lowest priority level, but it may be assigned any suitable priority level such as above the background task 18. FIG. 12 shows an embodiment of the present invention comprising a separate RPO task 90 rather than implement the RPO algorithm in the execution task 16. The RPO task 90 is assigned a priority level higher than the background task 18, but it may be assigned any suitable priority level, such as above the execution task 16 or the host task 14.

We claim:
1. A disk drive comprising:
(a) a disk;
(b) a head actuated radially over the disk;
(c) a read/write channel for interfacing with the disk through the head; and
(d) a microprocessor for executing a preemptive multitasking operating system, the preemptive multitasking operating system comprising a plurality of preemptive tasks, each preemptive task comprising a different priority level, the plurality of preemptive tasks comprising:

a disk task for processing disk commands by initiating seek operations and configuring parameters of the read/write channel;

a host task for initiating disk commands in response to host commands received from a host computer;

a background task for initiating disk commands to perform background operations including a defect scan of the disk; and an execution task for arbitrating the disk commands generated by the host task and the background task and for transmitting the arbitrated disk commands to the disk task.

2. The disk drive as recited in claim 1, wherein the priority level of the disk task is higher than the priority level of the host task.

3. The disk drive as recited in claim 1, wherein the priority level of the host task is higher than the priority level of the execution task.

4. The disk drive as recited in claim 3, wherein the priority level of the execution task is higher than the priority level of the background task.

5. The disk drive as recited in claim 1, wherein the execution task executes a rotational position optimization (RPO) algorithm for selecting a next disk command to execute relative to a location of the head with respect to the disk.

6. The disk drive as recited in claim 1, wherein the preemptive multitasking operating system comprises a plurality of interrupt requests (IRQs) including a host bus interface interrupt generated by host interface circuitry communicating with the host computer, wherein the host task receives a host command in response to the host bus interface interrupt.

7. The disk drive as recited in claim 1, wherein the preemptive multitasking operating system comprises a plurality of interrupt requests (IRQs) including a disk formatter interrupt for configuring disk format parameters associated with a format of the disk, wherein the disk task is notified when the data formatter interrupt finishes processing a current command.

8. The disk drive as recited in claim 5, wherein the preemptive multitasking operating system comprises a plurality of interrupt requests (IRQs) including a wedge event interrupt, wherein the disk task is notified when the wedge event interrupt determines a seek operation has completed and the execution task is notified when the wedge event interrupt determines the head has reached a servo wedge associated with the RPO algorithm.

9. The disk drive as recited in claim 8, wherein:
(a) the disk comprises a plurality of servo wedges; and
(b) the preemptive multitasking operating system further comprises a servo wedge interrupt for performing servo operations at each servo wedge.

10. The disk drive as recited in claim 9, wherein:
(a) the preemptive multitasking operating system further comprises a fast interrupt request (FIQ) having a priority level higher than the IRQs;
(b) the FIQ implements the servo wedge interrupt; and
(c) the FIQ interfaces with the disk task through the wedge event interrupt.

11. The disk drive as recited in claim 1, wherein the disk task performs error recovery when an error is detected while accessing the disk.

12. The disk drive as recited in claim 11, wherein the disk task performs retry error recovery when an error is detected while accessing the disk.

13. The disk drive as recited in claim 11, wherein the disk task performs firmware error correction code (ECC) processing when an error is detected while accessing the disk.

14. The disk drive as recited in claim 1, wherein:
(a) the disk comprises a plurality of tracks;
(b) each track comprises a plurality of data sectors;
(c) each data sector stores a data block; and
(d) the disk task relocates data blocks from marginal data sectors to spare data sectors.

15. The disk drive as recited in claim 14, wherein the disk task accesses the data blocks stored in the spare data sectors during disk access operations.

16. The disk drive as recited in claim 1, wherein the disk comprises a reserved area for storing a plurality of system files and the disk task performs read and write operations on the system files.

17. The disk drive as recited in claim 1, wherein the plurality of preemptive tasks comprises an error recovery task for performing firmware error correction code (ECC) processing when an error is detected while accessing the disk.

18. The disk drive as recited in claim 17, wherein the disk task performs retry error recovery concurrent with the error recovery task performing firmware error correction code (ECC) processing when an error is detected while accessing the disk.

19. The disk drive as recited in claim 1, wherein the plurality of preemptive tasks comprises a rotational position optimization (RPO) task for selecting a next disk command to execute relative to a location of the head with respect to the disk.

20. A method of executing a preemptive multitasking operating system in a disk drive, the disk drive comprising a disk, a head actuated radially over the disk, and a read/write channel for interfacing with the disk through the head, the method comprising the steps of:
(a) executing a disk task for processing disk commands by initiating seek operations and configuring parameters of the read/write channel;
(b) executing a host task for initiating disk commands in response to host commands received from a host computer;
(c) executing a background task for initiating disk commands to perform background operations including a defect scan of the disk; and
(d) executing an execution task for arbitrating the disk commands generated by the host task and the background task and for transmitting the arbitrated disk commands to the disk task, wherein each task is preemptive according to a predetermined priority level.

21. The method as recited in claim 20, wherein the priority level of the disk task is higher than the priority level of the host task.

22. The method as recited in claim 20, wherein the priority level of the host task is higher than the priority level of the execution task.

23. The method as recited in claim 22, wherein the priority level of the execution task is higher than the priority level of the background task.

24. The method as recited in claim 20, wherein the execution task executes a rotational position optimization (RPO) algorithm for selecting a next disk command to execute relative to a location of the head with respect to the disk.

25. The method as recited in claim 20, wherein the preemptive multitasking operating system comprises a plurality of interrupt requests (IRQs) including a host bus interface interrupt generated by host interface circuitry communicating with the host computer, wherein the host task receives a host command in response to the host bus interface interrupt.

26. The method as recited in claim 20, wherein the preemptive multitasking operating system comprises a plurality of interrupt requests (IRQs) including a disk formatter interrupt for configuring disk format parameters associated with a format of the disk, wherein the disk task is notified when the data formatter interrupt finishes processing a current command.

27. The method as recited in claim 26, wherein the preemptive multitasking operating system comprises a plurality of interrupt requests (IRQs) including a wedge event interrupt, wherein the disk task is notified when the wedge event interrupt determines a seek operation has completed and the execution task is notified when the wedge event interrupt determines the head has reached a servo wedge associated with the RPO algorithm.

28. The method as recited in claim 27, wherein:
(a) the disk comprises a plurality of servo wedges; and
(b) the preemptive multitasking operating system further comprises a servo wedge interrupt for performing servo operations at each servo wedge.

29. The method as recited in claim 28, wherein:
(a) the preemptive multitasking operating system further comprises a fast interrupt request (FIQ) having a priority level higher than the IRQs;
(b) the FIQ implements the servo wedge interrupt; and
(c) the FIQ interfaces with the disk task through the wedge event interrupt.

30. The method as recited in claim 20, wherein the disk task performs error recovery when an error is detected while accessing the disk.

31. The method as recited in claim 30, wherein the disk task performs retry error recovery when an error is detected while accessing the disk.

32. The method as recited in claim 30, wherein the disk task performs firmware error correction code (ECC) processing when an error is detected while accessing the disk.

33. The method as recited in claim 20, wherein:
(a) the disk comprises a plurality of tracks;
(b) each track comprises a plurality of data sectors;
(c) each data sector stores a data block; and
(d) the disk task relocates data blocks from marginal data sectors to spare data sectors.

34. The method as recited in claim 33, wherein the disk task accesses the data blocks stored in the spare data sectors during disk access operations.

35. The method as recited in claim 20, wherein the disk comprises a reserved area for storing a plurality of system files and the disk task performs read and write operations on the system files.

36. The method as recited in claim 20, further comprising the step of executing an error recovery task for performing firmware error correction code (ECC) processing when an error is detected while accessing the disk.

37. The method as recited in claim 36, further comprising the step of the disk task performing retry error recovery concurrent with the error recovery task performing firmware error correction code (ECC) processing when an error is detected while accessing the disk.

38. The method as recited in claim 20, further comprising the step of executing a rotational position optimization (RPO) task for selecting a next disk command to execute relative to a location of the head with respect to the disk.

* * * * *